US011548830B2

(12) United States Patent
Christiani et al.

(10) Patent No.: US 11,548,830 B2
(45) Date of Patent: *Jan. 10, 2023

(54) METHOD FOR PRODUCING A CERAMIC MOULDED BODY

(71) Applicant: Hermes Schleifmittel GmbH, Hamburg (DE)

(72) Inventors: Siegbert Christiani, Dresden (DE); Chriffe Omar Belda, Dresden (DE); Christian Wenzel, Dresden (DE)

(73) Assignee: HERMES SCHLEIFMITTEL GMBH, Dresden (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/075,366

(22) PCT Filed: Feb. 9, 2017

(86) PCT No.: PCT/EP2017/052829
§ 371 (c)(1),
(2) Date: Aug. 3, 2018

(87) PCT Pub. No.: WO2017/137483
PCT Pub. Date: Aug. 17, 2017

(65) Prior Publication Data
US 2019/0039961 A1   Feb. 7, 2019

(30) Foreign Application Priority Data
Feb. 9, 2016   (EP) .................... 16154893

(51) Int. Cl.
*C04B 38/06*        (2006.01)
*C04B 35/111*       (2006.01)
*B24D 18/00*        (2006.01)
*C04B 35/63*        (2006.01)
*C04B 35/634*       (2006.01)
*B24D 3/18*         (2006.01)
*C04B 35/638*       (2006.01)
*C04B 111/00*       (2006.01)
*B28B 11/24*        (2006.01)

(52) U.S. Cl.
CPC .......... *C04B 38/0615* (2013.01); *B24D 3/18* (2013.01); *B24D 18/0009* (2013.01); *B28B 11/243* (2013.01); *C04B 35/111* (2013.01); *C04B 35/634* (2013.01); *C04B 35/638* (2013.01); *C04B 35/6316* (2013.01); *C04B 38/0605* (2013.01); *C04B 2111/00362* (2013.01); *C04B 2235/449* (2013.01); *C04B 2235/5427* (2013.01); *C04B 2235/5436* (2013.01); *C04B 2235/5472* (2013.01); *C04B 2235/6562* (2013.01); *C04B 2235/77* (2013.01); *C04B 2235/96* (2013.01)

(58) Field of Classification Search
CPC ........ B24D 18/0009; B24D 3/18; B24D 3/00; C04B 35/111; C04B 35/6316; C04B 35/634; C04B 35/638; C04B 38/0605; C04B 2111/00362; C04B 2235/449; C04B 2235/5427; C04B 2235/5436; C04B 2235/6365; C04B 2235/77; C04B 2235/96; C04B 2235/963
See application file for complete search history.

(56) References Cited

U.S. PATENT DOCUMENTS

| | | | |
|---|---|---|---|
| 3,572,417 A | 3/1971 | Wismer | |
| 3,928,520 A * | 12/1975 | Shinomoto | ............ C09D 13/00 264/42 |
| 4,230,784 A * | 10/1980 | Nishiguchi | ......... G03G 9/0823 430/110.4 |
| 5,047,085 A | 9/1991 | Hihara et al. | |
| 5,590,387 A * | 12/1996 | Schmidt | ................ B22F 1/0014 419/36 |
| 5,929,255 A * | 7/1999 | Forgac | .................... C07C 51/43 549/257 |
| 8,207,447 B2 | 9/2012 | Yasukawa et al. | |
| 2004/0152034 A1* | 8/2004 | Cummings | ........... C04B 35/645 433/8 |
| 2008/0233416 A1* | 9/2008 | Takase | ............. C04B 35/63424 428/480 |
| 2010/0154315 A1* | 6/2010 | Wu | ......................... B24D 3/18 51/296 |

(Continued)

FOREIGN PATENT DOCUMENTS

| | | |
|---|---|---|
| DE | 2247103 | 4/1974 |
| EP | 0122640 | 10/1984 |

(Continued)

OTHER PUBLICATIONS

International Search Report for PCT/EP2017/052829, dated May 2, 2017, 6 pages, includes English translation.
Wilhoit et al., Thermochemistry of Biologically Important Compounds: Heats of Combustion of Solid Organic Acids. J. Chem. Eng. Data. Oct. 1964;9(4):595.
Written Opinion of the International Search Authority for PCT/EP2017/052829, dated May 2, 2017, 14 pages.
International Preliminary Report on Patentability for PCT/EP2017/052829, dated Aug. 14, 2018, 13 pages.

(Continued)

*Primary Examiner* — Pegah Parvini
(74) *Attorney, Agent, or Firm* — Casimir Jones, S.C.; Rikki A. Hullinger

(57) ABSTRACT

The invention relates to a method for producing a ceramic moulded body, comprising the following steps: a) producing a green body containing ceramic material, binding agents and an organic pore forming agent; b) heating the green body to a temperature higher than the sublimation and/or decomposition temperature of the pore forming agent; c) burning the green body to form a ceramic moulded body. According to the invention, the binding agent comprises polyglycols and fumaric acid.

15 Claims, 4 Drawing Sheets

(56) References Cited

U.S. PATENT DOCUMENTS

| | | |
|---|---|---|
| 2010/0159805 A1 | 6/2010 | Goldsmith |
| 2013/0207055 A1* | 8/2013 | Gotou .................... C04B 24/12 |
| | | 252/519.33 |
| 2015/0053409 A1* | 2/2015 | Legemah ............... C09K 8/725 |
| | | 166/308.5 |
| 2017/0095507 A1* | 4/2017 | Li ........................ A61K 31/732 |
| 2019/0039212 A1 | 2/2019 | Christiani et al. |

FOREIGN PATENT DOCUMENTS

| | | | | |
|---|---|---|---|---|
| EP | 2 450 445 | * | 1/2013 | ............... B24D 3/00 |
| EP | 2540445 | | 1/2013 | |
| EP | 2546212 | | 1/2013 | |
| WO | WO 1993/20021 | | 10/1993 | |
| WO | WO 2017/137482 | | 8/2017 | |

OTHER PUBLICATIONS

Notice of Opposition for EP 17703764.5, mailed Nov. 4, 2020, 22 pages.
Office Action and Search Report for CN2017800103211, dated Sep. 17, 2019, 6 pages.
Office Action and Search Report for CN2017800103211, dated Apr. 21, 2020, 6 pages.

* cited by examiner

METHOD FOR PRODUCING A CERAMIC MOULDED BODY

The invention relates to a method for producing a ceramic molding, in particular a porous tool composed of bonded abrasive.

Tools composed of bonded abrasive are used extensively in engineering for surface processing. Tools of this kind are, for example, sanding disks, sanding segments, sanding rods or honing stones.

To produce such a tool, an abrasive (for example corundum, silicon carbide, diamond or CBN of a desired grain size) is processed with a binder (particularly a ceramic binder), optionally additives and temporary binders, to give a mixture. This is then compressed to give a green body of the desired shape. The green body is subsequently dried at suitable temperatures, optionally freed of pore formers and finally fired to a ceramic.

Depending on the intended use, a tool of this kind ought to have a certain porosity, usually also a certain pore shape, pore size and pore size distribution. It is therefore known to add a pore former (usually naphthalene) to the mixture, which occupies the appropriate amount of space in the green body. The pore former is removed by evaporation, sublimation or also by firing. This can be effected during the heating phase of the sintering process or in a temporally upstream method step at lower temperatures. In particular, naphthalene can be removed previously at comparatively low temperatures, specifically by sublimation at ca. 80° C. Further important advantages of naphthalene are the good miscibility with other formulation components and also the very low springback after compression, whereby cracks in the green body are avoided. Finally, the removal at a relatively low temperature is enabled, in which the abrasive body is already dried and other constituents of the sanding disk mixture, for example binding components, are not yet activated.

The disadvantages of naphthalene as pore former are its toxic and environmentally hazardous properties. By virtue of an intense and typical inherent odor, it pollutes the production facilities and also the immediate surroundings via the exhaust air. The expense in terms of occupational safety and health and environmental protection dominates the relevant manufacturing steps in the production process. Furthermore, naphthalene is able to form explosive mixtures with air. Accordingly, complex and cost-intensive safety precautions are required.

In terms of sustainability and conservation of resources, it would in principle be possible to process naphthalene by resublimation and to reuse it. This process is uneconomic however, with the result that it is typically fed to an afterburner.

Owing to the serious disadvantages of naphthalene, numerous experiments have been undertaken to replace it with alternative pore formers. Used in this case are, for example, granules of nutshells or of plastics, dextrin, cellulose, carbon (petroleum coke or activated carbon), cocoa powder or even wax. Apart from para-dichlorobenzene, which has similar properties—positive as well as negative—to naphthalene, these alternatives, on the basis of the different manufacturing steps, have considerable, sometimes several of the disadvantages listed below:

substances which cause springback after molding. The green bodies exhibit cracks directly after ejection from the molding tool or a short time thereafter porous pore formers, for example activated carbon, remove moisture from the composition such that, during a brief storage time of the mixtures, the consistency thereof alters substances that comprise iron compounds which leave behind inorganic residues as red-brown, hard spots in the fired abrasive body meltable substances may of course be removed by evaporating the liquid phase (i.e. not by sublimation), but significantly higher temperatures than 80° C. are required for this purpose. Similar to the case with naphthalene, explosive mixtures may be formed as a result the possibility of evaporating substances in the kiln usually requires an extended holding time which can distinctly reduce the productivity of the firing system. Furthermore, explosive mixtures may form in this process and mixture components can be activated prematurely.

the combustion or decomposition of pore formers in the kiln can lead to an intensive gas evolution such that the green body that is not yet sufficiently solid is broken up while in the fire.

the combustion of pore formers causes an additional heat evolution which may cause a local deviation from the set point temperature.

particularly in the case of voluminous abrasive bodies, a lack of oxygen may occur locally resulting in incomplete combustion. As a result, black, carbon-containing residues remain in the abrasive body which, inter alia, adversely affect the purity, homogeneity of the hardness and the grinding performance of the abrasive body.

independently of the drying and firing conditions, the use of different pore formers may lead to altered properties of the end product. For instance, abrasive bodies produced using naphthalene substitutes sometimes have inadequate grinding capacity and diminished mechanical strength.

substances that are unable to mix homogeneously with the remaining abrasive body composition.

EP 2 251 143 A1 discloses a process using wax as pore former and this is removed after liquefying by means of an absorbent prior to the firing process. Many of the aforementioned disadvantages are overcome in this manner, but complete removal of the wax from the green body is not possible. Accordingly, the residual amounts remaining react exothermically during the firing process and may damage the abrasive body without appropriate precautions.

EP 2 540 445 A1 discloses the use of oxalic acid as pore former. This decomposes into gaseous decomposition products on heating the green body.

During production of a green body, a temporary binder is frequently used.

This temporary binder serves to preserve the structural integrity and true shape during production and handling of the green body, until this is ensured by the actual sintering to give the ceramic molding (and by the ceramic binder).

In the prior art, dextrin/water systems for example are used as temporary binders. This binder system is not a risk to health and can be readily removed (burned off) in the course of the firing process, but alters the strength of a green body associated thereto depending on the humidity/water content, such that the storage of a green body produced using this binder system at undefined humidity may lead, for example, to defects (dry cracks).

Wax is also known as temporary binder in the prior art. A major disadvantage of wax is that ignitable mixtures can form on heating/burning off such that complex protective measures should be taken.

The object of the invention is to create a method of the type specified at the outset, which enables a simple and, in process engineering terms, an easily manageable production of a ceramic molding and which avoids or prevents the disadvantages described above of the known temporary binders.

Figure 1:
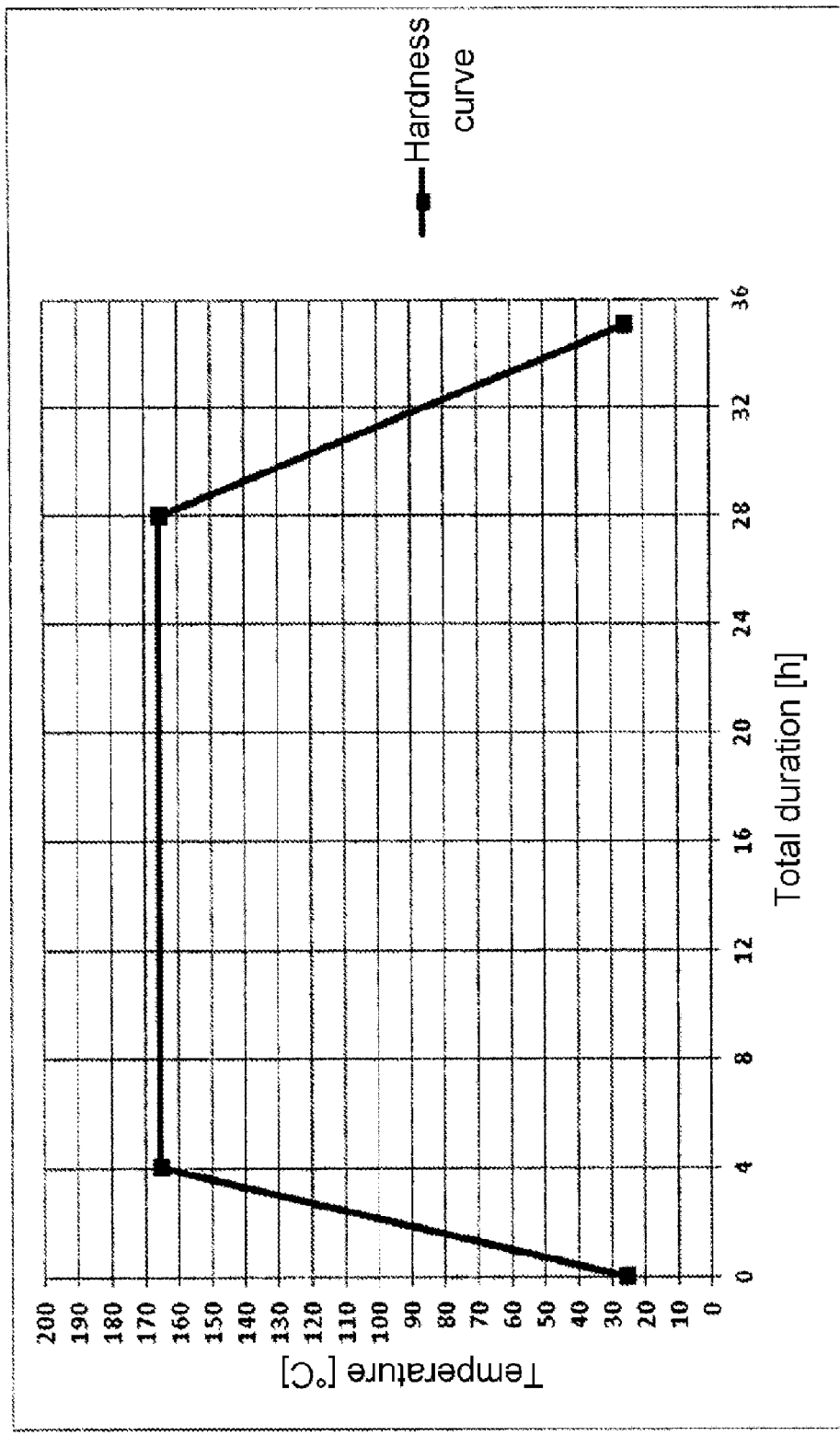
FIG. 1 shows an exemplary hardness curve for the PEG/fumaric acid humidification.

The invention relates to a method for producing a ceramic molding comprising the steps of:
a) producing a green body comprising ceramic material, binders and an organic pore former;
b) heating the green body to a temperature above the sublimation and/or decomposition temperature of the pore former;
c) firing the green body to form a ceramic molding.

In accordance with the invention, it is provided that the binder comprises polyglycols and fumaric acid as a divalent carboxylic acid capable of esterification with the terminal hydroxyl groups of the polyglycols.

In addition, some terms used in the context of the invention are further explained.

The terms "ceramic molding", "tool composed of bonded abrasive", "abrasive", "binder" and "green body" are used in such a way in the present application as they are familiar to those skilled in the art from the prior art.

Ceramic material is an inorganic material which remains unchanged as such in the sintering process. An example is abrasive grit.

The term binder includes both ceramic binders for producing the ceramic binding during the sintering process and temporary binders. Temporary binders serve firstly for the production and protection of the dimensional stability in the course of the production, storage and movement of the green body and secondly for protecting the structural integrity in the course of heating for the removal of the pore former.

The core of the invention lies in the fact that the binder comprises polyglycols, preferably polyethylene glycols (PEG), and also fumaric acid as a divalent carboxylic acid capable of reaction with the terminal hydroxyl groups of the polyglycols.

The invention has identified that, surprisingly, polyglycols, preferably polyethylene glycols, with fumaric acid form an advantageous temporary binder system.

An attempt at an explanation for this surprising advantageous behavior that does not limit the invention is that the terminal OH groups of the polyethylene glycols react with the carboxyl groups forming esters and in this manner form a temporary binder system. The bonding (esterification) of acid and polyethylene glycols takes place preferably at a temperature which is below the sublimation temperature of the pore former used. Fumaric acid esterifies with polyethylene glycols at about 165° C., which is significantly below the sublimation temperature of 180 to 200° C. A sufficient esterification of fumaric acid can be achieved in accordance with the invention even at lower temperatures, for example about 90° C. However, this requires the temperature to be maintained longer.

An esterification of this kind takes place particularly with low molecular weight liquid PEG, for example in the molecular weight range of 300 to 600. The temporary binder system thus formed from about 165° C. serves particularly to stabilize the green body in the course of the subsequent removal of the pore former.

To be distinguished therefrom is a temporary binder system stage upstream, which already serves during the production, storage and movement of the green body to ensure the desired dimensional stability and handling prior to the first heating. For these initial binders, temporary binder systems known from the prior art can be used which also comprise, for example, PEG. In this case, preference is given to using higher molecular weight solid PEGs such as PEG 6000 for example.

The fumaric acid used in accordance with the invention has a decomposition temperature or sublimation temperature which is above the reaction temperature with the polyethylene glycols, and therefore the reaction to afford the binder system according to the invention can be carried out. Accordingly, oxalic used would not be usable in accordance with the invention since this decomposes from about 150° C., which is below the reaction temperature with the polyethylene glycols.

The invention has identified that this binder system enables the preparation of more rigid, more stable green bodies that are independent of the humidity during storage. The binder system can be burnt off free of residues and without forming ignitable gas mixtures or undesirable combustion residues (black spots). The system is stable up to the debinding and beforehand, for example, exhibits no undesirable melting or boiling.

Advantageous molecular weight ranges for the polyethylene glycols are 100 to 20 000, more preferably 200 to 10 000, more preferably 250 to 8000. PEGs in the molecular weight range up to 600 are typically liquid. A preferred range of such liquid PEGs is 300 to 600.

All pore formers known from the prior art can be used as pore formers in accordance with the invention.

However, it is particularly preferred in accordance with the invention if the fumaric acid used as constituent of the binder system according to the invention is used additionally as pore former.

In this particularly preferred embodiment of the invention, therefore, the fumaric acid or the pore former can perform a double function. In the first step, it becomes a constituent of a temporary binder by means of reaction (esterification) with polyglycols or polyethylene glycols. In the second step (at higher temperature), the remainder of the pore former sublimes and is thus removed from the green body. At a still higher temperature, during sintering, the temporary binder system is then burned off.

So that the pore former can perform this double function, it must be added in sufficient stoichiometric excess relative to the polyethylene glycols. The proportion that did not react with the polyethylene glycols in the first step then remains as pore former in the green body.

The bonding (esterification) of acid and polyethylene glycols is preferably effected at a temperature below the sublimation temperature of the pore former used. For example, fumaric acid esterifies with polyethylene glycols at about 165° C., which is significantly below the sublimation temperature of 180 to 200° C.

This means that, on heating the green body to remove the pore former, this sublimes without decomposition. This has a series of advantages compared to the prior art, which uses oxalic acid for example.

Oxalic acid starts to sublime at about 100° C. and decomposition occurs from about 150 to 160° C. If it is desired to remove oxalic acid as pore former practically completely by sublimation without decomposition, on one hand the temperature of about 100° C. has to be exceeded in the entire volume in the green body while on the other hand it must at no point exceed the range from about 150° C. This means that only a very slow heating must take place and a range from about 120 to 130° C. has to be maintained over a relatively long period, for example, of about 24 h.

If the heating is effected more rapidly, it may happen, due to the geometrical shape of the oven or of the molding or due to other non-uniformities in the heating process, that the decomposition temperature of about 150 to 160° C. is already exceeded locally and, instead of sublimation, decomposition of the oxalic acid results, forming high volumes of gas.

Even independently of the rate of the heating process, there may be local temperature inhomogeneities in an oven which result in the decomposition temperature already being exceeded in some regions of the green body. On escape of the considerable volume during decomposition, this can result in undesirable crack formation in the green body.

In the case of sublimation, substantially lower volumes of gas escape under conditions that are more easily controlled, such that crack formation of this kind can be avoided. This allows the production of a green body with defined porosity without impairment of the structural integrity. The use of a pore former provided in accordance with the invention ensures that, even during relatively rapid heating or in the case of temperature inhomogeneities in the oven, undesirable decomposition forming high volumes of gas can be avoided. In the context of the invention it is therefore frequently possible to avoid a separate upstream step for removal of the pore former and to effect this removal of the pore former in the course of the heating in preparation for the sintering process.

A pore former escaping by sublimation may be captured and reused. No decomposition products are formed which may be toxic or aggressive.

The sublimation temperature of the pore former is fumaric acid between 180 and 200° C. The gaseous pore former escaping without decomposition can therefore be removed before reaching the actual sintering temperature of the green body.

The pore former is in the solid state, preferably plastically deformable and has no or only very low springback. In this manner, it is avoided that the green body is damaged by springback and volume enlargement of the pore former linked thereto.

Generally, pores should be distributed as homogeneously as possible in the tool. For this purpose, it is necessary to mix the pore former equally homogeneously with the remaining mixture constituents of the green body. In order to largely avoid an undesirable demixing in this case, it is preferable that the density of the pore former is similar to the density of the remaining constituents of the green body. Preferably, the density of the pore former can be between 1.3 and 2 $g/cm^3$, preferably 1.4 and 1.8 $g/cm^3$.

In accordance with the invention, fumaric acid is used as pore former (with the double function as constituent of the binder system according to the invention). Fumaric acid has a sublimation temperature of about 200° C. and only decomposes above 350° C. It can therefore sublime on heating the green body and escape undecomposed with formation of comparatively low volumes of gas.

Fumaric acid is storage-stable and non-hygroscopic. It therefore does not accumulate any water of hydration as pore former. This is of particular advantage since water of hydration evaporates with formation of large volumes on heating a green body even at temperatures from 50° C. and can result in crack formation in the green body. Oxalic acid used in the prior art for example is highly hygroscopic and therefore when used as pore former regularly results in large amounts of water of hydration being incorporated.

Fumaric acid is non-toxic and is approved as a food additive. When used and processed therefore, no corresponding precautions have to be met. This is a major advantage compared to other subliming pore formers used in the prior art such as naphthalene for example.

The ignition temperature of fumaric acid is more than 150K above the sublimation temperature. The green body can therefore be heated to remove the fumaric acid without hazard.

The proportion of fumaric acid/pore former of the total weight of the green body according to the invention can preferably be between 2 and 60% by weight, more preferably 2 and 50% by weight, more preferably 10 and 50% by weight, more preferably 10 and 30% by weight, more preferably 15 and 20% by weight. The use of subliming pore formers according to the invention renders the use of high proportions of a pore former possible, for example in the range of 50% by weight or more, without resulting in damage to the green body due to high gas volumes on escape of the pore former. Accordingly, moldings having high porosity can be produced. The proportions by weight of the pore former specified refer to the total amount added of the substance capable in principle of pore formation, independently of whether it actually participates in pore formation or potentially performs another function or participates therein (binder for example).

In order to release the gas volumes which escaped during sublimation of the pore former in a controlled manner and without adversely affecting the green body it may be preferable to carry out the heating at or above the sublimation temperature of the pore former using a defined temperature regime. Preference is given here to a heating rate of 2 to 80° C./h, more preferably 20 to 60° C./h. A particular advantage of the invention is that even comparatively rapid heating is possible without adversely affecting the structural integrity of the green body.

In accordance with the invention, it can be provided that, prior to heating at or above the sublimation temperature of the pore former, additionally, heating to a temperature below the sublimation temperature of the pore former, preferably 40 to 90° C., is carried out and the green body is maintained at this temperature for a time period, which in particular allows the evaporation of volatile constituents such as water or solvent. This time period is preferably between 4 and 48 h. When using a non-hygroscopic pore former such as fumaric acid, this heating below the sublimation temperature can be brief or omitted completely.

The ceramic molding produced in accordance with the invention can be in particular a tool composed of bonded abrasive. Likewise conceivable is a formation as ceramic molding for other purposes, in particular commercial or industrial.

In the context of the invention, a pore former, such as fumaric acid in particular, can be used in two different particle size fractions. A fraction with small particle sizes of, for example, 100 μm or less, preferably 1-100 μm, more preferably 1-30 μm and more preferably 1-20 μm is intended to be available as far as possible in finely distributed form in the green body as reactant for the esterification with PEG.

A larger granulated fraction, having an average particle size of 1 mm for example, serves primarily for pore formation.

The invention is elucidated below by means of working examples.

EXAMPLE 1

2 identical abrasive bodies of dimensions 300×20×127 were produced from the following formulations. The ceramic binder used in this and all further examples is a mixture of 50% by weight frit 90158 (Ferro), 25 percent by weight clay and 25% by weight petalite.

| 1. | Sintered corundum F100 | 20.8% |
|---|---|---|
| | Special fused alumina F100 | 62.5% |
| | Ceramic binder | 16.7% |
| | Naphthalene | 13.0% |
| | (powder ca. 200 μm particle size) | |
| | Dextrin powder | 2.0% |
| | Water | 2.8% |
| | Density after firing: | 1.78 g/cm$^3$ |
| | Modulus of elasticity: | 29.0 GPa |

| 2. | Sintered corundum F100 | 20.8% |
|---|---|---|
| | Special fused alumina F100 | 62.5% |
| | Ceramic binder | 16.7% |
| | Fumaric acid | 16.1% |
| | (powder ca. 200 μm particle size) | |
| | PEG 300 | 3.0% |
| | PEG 6000 | 1.0% |
| | Density after firing: | 1.77 g/cm$^3$ |
| | Modulus of elasticity: | 29.0 GPa |

The abrasive body composition according to formulation 1 with naphthalene as pore former was compressed and subsequently dried at 80° C. in a drying oven equipped with thermal afterburning system and the naphthalene was debinded. The abrasive bodies were then fired at a maximum temperature of 950° C. in a ceramic kiln (Energo oven).

The abrasive body composition according to formulation 2 with fumaric acid as pore former was compressed and subsequently hardened/esterified at a maximum temperature of 165° C. for 24 h in a hardening oven (Reinhardt oven). The hardness curve shown in FIG. 1 was applied.

The abrasive bodies were subsequently fired at a maximum temperature of 950° C. in a ceramic kiln (Energo oven). In the heating phase, the heating rate was ca. 30-50° C./h. In the heating phase the fumaric acid was debinded.

Figure 2:
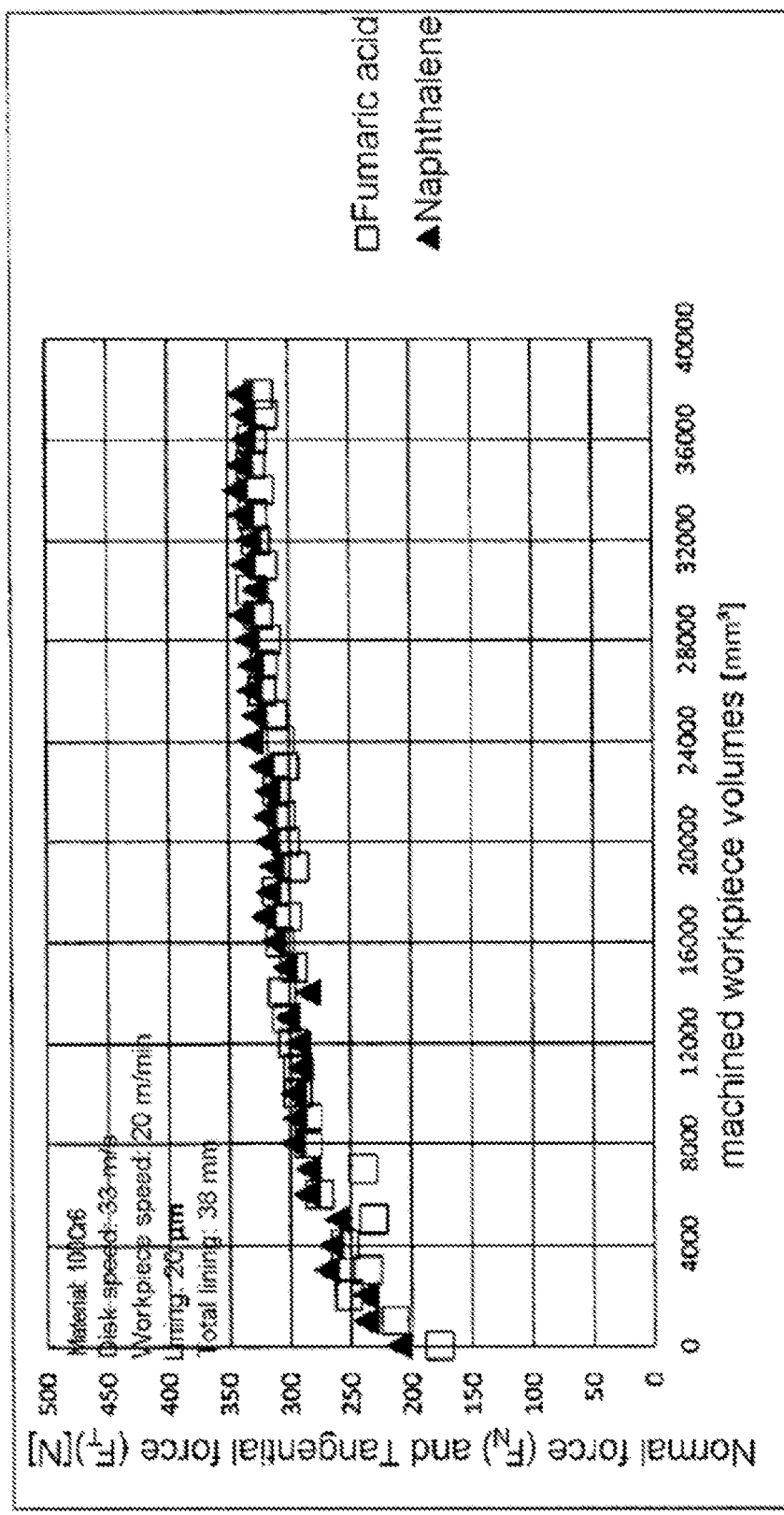
FIG. 2 shows measurements of grinding forces of the abrasive bodies produced with naphthalene and fumaric acid as pore formers.
Figure 3:
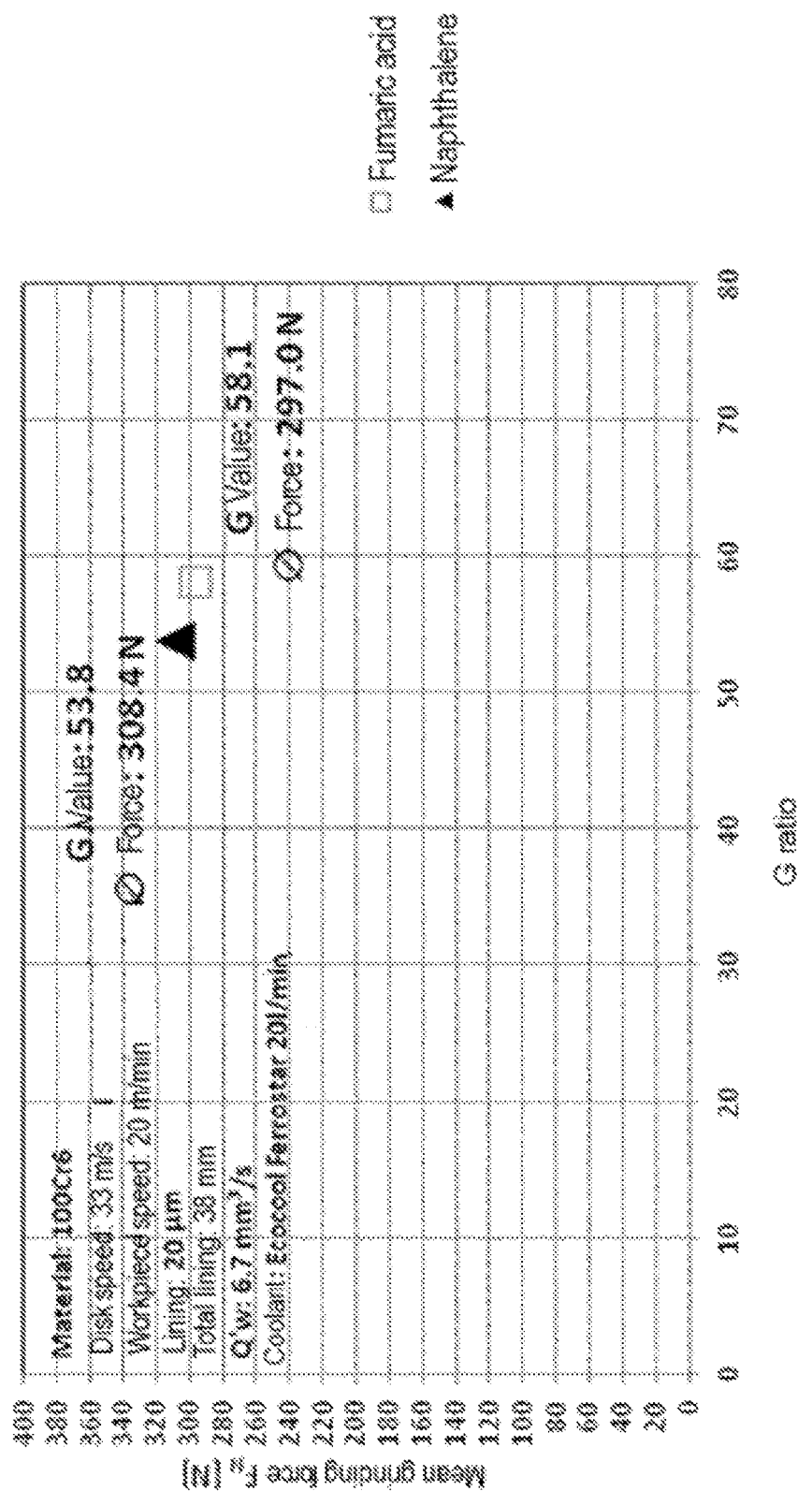
FIG. 3 shows measurements of the G ratio of the abrasive bodies produced with naphthalene and fumaric acid as pore formers.
Figure 4:
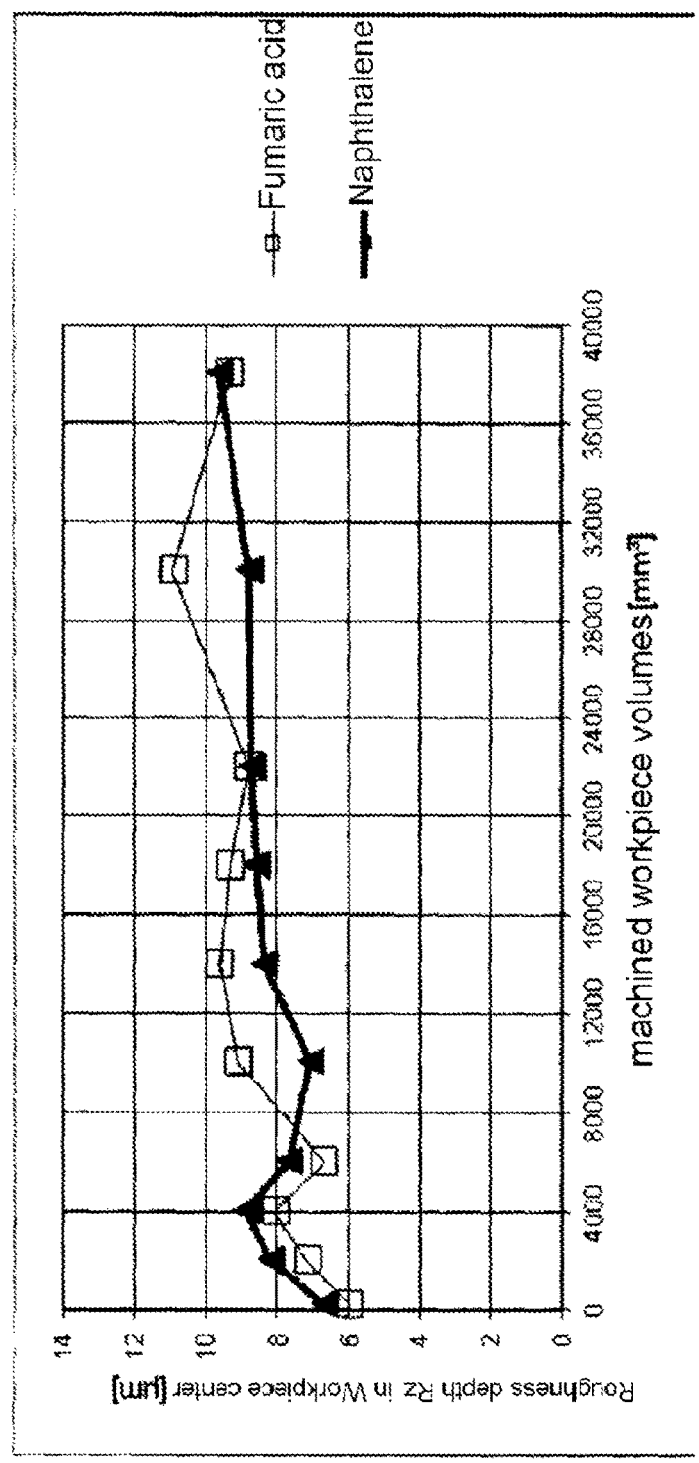
FIG. 4 measurements of the roughness (R2) of the abrasive bodies produced with naphthalene and fumaric acid as pore formers.

The abrasive bodies produced with the fumaric acid and naphthalene pore formers were compared by sanding on a grinding test stand (Blohm flat grinding machine). The grinding force (FIG. 2), the G ratio (FIG. 3), and the roughness (FIG. 4) were measured in each case relative to the machined workpiece volumes.

The grinding forces caused by these abrasive bodies are almost identical.

The G ratio of the abrasive body produced with fumaric acid is somewhat greater and the grinding force somewhat lower.

The roughness of the abrasive body is also to be assessed as about the same.

Overall, it can be shown that the grinding performance of both abrasive bodies can be rated as equivalent.

EXAMPLE 2

Production of a highly porous test specimen (diameter 202, height 100 mm).
Formulation:

| Special fused alumina F80 | 88.6% |
|---|---|
| Ceramic binding | 11.4% |
| PEG 300 | 4.0% |
| PEG 6000 | 3.0% |
| Fumaric acid | 40.0% |
| (Granules 500-800 μm) | |
| Density after firing: | 1.39 g/cm$^3$ |

The formulation components were homogeneously mixed and subsequently compressed. The disk was then debinded in a drying oven equipped with thermal afterburning system. The debinding curve included the heating at 50° C./h up to 200° C., maintaining the maximum temperature of 200° C. over 48 h and the natural cooling of the oven to room temperature. The strength was then fully sufficient to assemble the disk on the kiln car for ceramic firing. The abrasive bodies were then fired at a maximum temperature of 950° C. in a ceramic kiln (Energo oven).

The invention claimed is:

1. A method for producing a ceramic molding comprising the steps of:
    a) producing a green body comprising ceramic material, binders, and fumaric acid as an organic pore former with an additional function as a constituent in a temporary binder system;
    b) heating the green body to a temperature above the sublimation and/or decomposition temperature of the organic pore former;
    c) firing the green body to form a ceramic molding;
    wherein the temporary binder system comprises a low molecular weight liquid polyethylene glycol (PEG) with a molecular weight of 300 to 600 and fumaric acid, wherein binding of PEG and fumaric acid occurs at a temperature below the sublimation temperature of the organic pore former, wherein the proportion of the organic pore former of the total weight of the green body in step a) is between 2 and 60% by weight.

2. The method of claim 1, wherein the organic pore former comprises particles in at least two different particle size fractions.

3. The method of claim 1, wherein a finer particle size fraction has a particle size from 1-100 μm.

4. The method of claim 1, wherein in step b) heating is conducted at a heating rate of 2 to 80° C./h.

5. The method of claim 1, further comprising, prior to step b) a step of heating the green body to a temperature below the sublimation temperature of the organic pore former and maintaining the green body below the sublimation temperature of the organic pore former for a time period during which volatile constituents are evaporated.

6. The method as claimed in claim 1, characterized in that the ceramic molding is a tool composed of bonded abrasive.

7. The method as claimed in claim 3, wherein the finer particle size fraction has a particle size from 1-30 µm.

8. The method as claimed in claim 3, wherein the finer particle size fraction has a particle size from 1-20 µm.

9. The method of claim 1, wherein the proportion of organic pore former of the total weight of the green body in step a) is between 2 and 50% by weight.

10. The method of claim 1, wherein the proportion of organic pore former of the total weight of the green body in step a) is between 10 and 50% by weight.

11. The method of claim 1, wherein the proportion of organic pore former of the total weight of the green body in step a) is between 10 and 30% by weight.

12. The method of claim 1, wherein the proportion of organic pore former of the total weight of the green body in step a) is between 15 and 20% by weight.

13. The method of claim 4, wherein the heating in step b) is conducted at a heating rate of 20 to 60° C./h.

14. The method of claim 5, wherein heating to the temperature below the sublimation temperature of the organic pore former is carried out at 40 to 90° C.

15. The method of claim 5, wherein the green body is maintained at the temperature below the sublimation temperature of the organic pore former for 4 to 48 hours.

* * * * *